US011441506B2

United States Patent
Saint-Macary (10) Patent No.: US 11,441,506 B2
(45) Date of Patent: Sep. 13, 2022

(54) METHOD FOR CONTROLLING THE DUTY CYCLE OF A SIGNAL ENABLING THE CURRENT CONTROL OF A CONVERSION MODULE OF A CONVERTER

(71) Applicant: VITESCO TECHNOLOGIES GMBH, Hanover (DE)

(72) Inventor: Stéphane Saint-Macary, Toulouse (FR)

(73) Assignee: VITESCO TECHNOLOGIES GMBH, Hanover (DE)

( * ) Notice: Subject to any disclaimer, the term of this patent is extended or adjusted under 35 U.S.C. 154(b) by 84 days.

(21) Appl. No.: 17/254,650

(22) PCT Filed: Jun. 20, 2019

(86) PCT No.: PCT/EP2019/066359
§ 371 (c)(1),
(2) Date: Dec. 21, 2020

(87) PCT Pub. No.: WO2019/243503
PCT Pub. Date: Dec. 26, 2019

(65) Prior Publication Data
US 2021/0152086 A1  May 20, 2021

(30) Foreign Application Priority Data

Jun. 22, 2018 (FR) ...................................... 1855560

(51) Int. Cl.
*F02D 41/20* (2006.01)
(52) U.S. Cl.
CPC ........ *F02D 41/20* (2013.01); *F02D 2041/201* (2013.01); *F02D 2041/2017* (2013.01); *F02D 2041/2027* (2013.01)
(58) Field of Classification Search
CPC ............... F02D 41/20; F02D 2041/201; F02D 2041/2017; F02D 2041/2027
See application file for complete search history.

(56) References Cited

U.S. PATENT DOCUMENTS

| 2009/0096427 A1* | 4/2009 | Yang ................. H02J 7/007182 320/162 |
| 2015/0311795 A1 | 10/2015 | Yang et al. |
| 2017/0302166 A1 | 10/2017 | Chen et al. |

FOREIGN PATENT DOCUMENTS

DE    10 2015 103 907    9/2015

OTHER PUBLICATIONS

Masunaga, DE 102015103907, machine translation (Year: 2015).*

(Continued)

*Primary Examiner* — Hung Q Nguyen
*Assistant Examiner* — Mark L. Greene
(74) *Attorney, Agent, or Firm* — Nixon & Vanderhye (57) ABSTRACT

Disclosed is a method for regulating the duty cycle of a controlled current signal of a conversion module of a voltage converter including a step of measuring, by the microcontroller, the duty cycle of the envelope of the controlled current signal, and when the value of the duty cycle is below a predetermined threshold, a step of controlling, by the microcontroller, the current control module to decrease the amplitude of the control signal and that the duty cycle of the envelope of the controlled current signal thus tends toward a predetermined threshold, or when the value of the duty cycle is higher than the predetermined threshold, a step of controlling, by the microcontroller, the current control module so the current control module increases the amplitude of the controlled current signal and that the duty cycle of the envelope of the controlled current signal thus tends toward the predetermined threshold.

14 Claims, 2 Drawing Sheets

(56) References Cited

OTHER PUBLICATIONS

International Search Report for PCT/EP2019/066359 dated Oct. 1, 2019, 5 pages.
Written Opinion of the ISA for PCT/EP2019/066359 dated Oct. 1, 2019, 7 pages.

* cited by examiner

METHOD FOR CONTROLLING THE DUTY CYCLE OF A SIGNAL ENABLING THE CURRENT CONTROL OF A CONVERSION MODULE OF A CONVERTER

CROSS-REFERENCE TO RELATED APPLICATIONS

This application is the U.S. national phase of International Application No. PCT/EP2019/066359 filed Jun. 20, 2019 which designated the U.S. and claims priority to FR 1855560 filed Jun. 22, 2018, the entire contents of each of which are hereby incorporated by reference.

BACKGROUND OF THE INVENTION

Field of the Invention

The present invention relates to the field of fuel injection control and relates more particularly to a method for regulating the duty cycle of a signal allowing the current control of a conversion module of a converter and to a computer implementing this method and to a vehicle comprising such a computer.

Description of the Related Art

In a motor vehicle with a combustion engine, fuel injection is controlled by an engine control computer, commonly called an electronic control unit or ECU. This computer comprises a microcontroller, a DC-to-DC converter, and an injector control module, commonly called a "driver".

The converter, which is a "boost" converter, comprises a conversion module configured so as to increase the value of the voltage delivered by the power supply battery for supplying power to vehicle equipment, for example 12 V, to a higher voltage value called "target voltage", for example 60 V, in order to charge what is called an "intermediate" capacitor connected between the converter and the control module. This conversion module comprises a switched-mode power supply, for example produced by an inductor, a diode and a transistor in a manner known per se.

The microcontroller controls the injector control module by means of control signals. More precisely, the microcontroller sends the injector control module control signals for controlling one or more injectors indicating the injection duration.

Upon receiving a control signal, the injector control module then drives the one or more injectors so as to inject fuel into the cylinders of the combustion engine. To do this, the injectors are opened and closed on the basis of a discharge current from the intermediate capacitor. Thus, when the one or more injectors are controlled, the intermediate capacitor is discharged until the end of injection opening, which causes the output voltage of the converter to drop. In order to recharge the intermediate capacitor, it is then necessary to wait a significantly long time for the converter to supply enough power for the value of the intermediate voltage to rise again to the target voltage, which may disrupt injection and therefore represents a drawback.

In order to partially overcome this drawback, it is known practice to integrate a current control module into the converter, which module is configured to control the current flowing through the transistor of the conversion module allowing power to be supplied by the converter. When the loads are intermittent, as is the case with fuel injectors, the converter will stop when it reaches the target voltage until the injectors are next controlled. In this binary mode of operation, called "on/off", the current control module controls the transistor such that it produces a high-frequency current signal by chopping in the active phases, corresponding to a supply of power by the converter (called "peak phases") aiming to reach the target voltage, and a zero current signal in the inactive phases of the converter, corresponding to the phases when the converter does not supply power, that is to say when its output is already at the target voltage (called "rest phases"). This current signal is thus called "controlled current signal". The current reference value to be reached by the controlled current signal in order to reach the reference voltage at the output of the conversion module is a value resulting from the voltage regulation which is generally the maximum attainable value.

The succession of these peak and rest phases of the controlled current signal defines an envelope of the controlled current signal which corresponds to an alternation of low-frequency states. A peak phase followed by a rest phase thus constitutes a cycle of the envelope of the controlled current signal and the ratio of the duration of a peak phase to the duration of the corresponding cycle defines a duty cycle which may vary between 0 and 100%.

However, in this solution, since the driving of the injectors is random, a controlled current signal of high intensity corresponding to the maximum value attainable in the peak phases is used in order to guarantee rapid recharging of the intermediate capacitor whatever the injection times. The recharging times are thus relatively short and the idle times relatively long. The duty cycles of the peak and rest phases resulting therefrom are therefore relatively low, for example less than 50%, which decreases the efficiency of the conversion module and may additionally lead to the converter heating up.

Therefore, there is a need for a solution that makes it possible to overcome these drawbacks at least in part.

SUMMARY OF THE INVENTION

To this end, a first subject of the invention is a method for regulating the duty cycle of the envelope of a control signal of a conversion module of a DC-to-DC voltage converter of a control computer for controlling a combustion engine of a motor vehicle, said engine comprising fuel injectors, said computer comprising a microcontroller, a DC-to-DC voltage converter and a control module for controlling the injectors, said converter comprising:
  a conversion module, configured to convert a DC voltage delivered by a power supply battery of the vehicle into a DC output voltage of higher value delivered to the control module for controlling the injectors by generating a current signal,
  a current control module configured to control said current signal of the conversion module, said "controlled" current signal exhibiting an alternation of phases of (preferably high-frequency) peaks of positive amplitude, allowing the conversion module to be controlled so that it delivers power allowing a target output voltage of the converter to be reached, and of phases of rest during which the value of said controlled current signal is zero, thus defining the envelope of the controlled current signal, a peak phase followed by a consecutive rest phase constituting a cycle and the ratio of the duration of a peak phase to the duration of the corresponding cycle constituting the duty cycle of the envelope of the controlled current signal at a given time, said method comprises:
- a step of measuring, by means of the microcontroller, the duty cycle of the envelope of the controlled current signal,
- when the value of the duty cycle is lower than a predetermined threshold, a step of controlling, by means of the microcontroller, the current control module so that said current control module decreases the amplitude of the controlled current signal and that the duty cycle of the envelope of said controlled current signal thus tends toward said predetermined threshold,
- when the value of the duty cycle is higher than said predetermined threshold, a step of controlling, by means of the microcontroller, the current control module so that said current control module increases the amplitude of the controlled current signal and that the duty cycle of the envelope of said controlled current signal thus tends toward said predetermined threshold.

The method according to the invention advantageously makes it possible to drive the current converter in an efficient manner so as to keep the duty cycle close to a threshold value making it possible to optimize its efficiency while limiting its heating. Regulating the duty cycle of the envelope of the controlled current signal in this way advantageously makes it possible to control the converter so that it reaches the target output voltage value quickly and efficiently while limiting its heating.

In one embodiment, the microcontroller provides the current control module with a predetermined amplitude value to be reached (setpoint) for the controlled current signal, which makes the control of the current control module both straightforward and efficient.

According to one aspect of the invention, said predetermined value is chosen from a list of predetermined values, preferably stored in a memory of the microcontroller.

Preferably, the predetermined value is chosen from a list of predetermined values according to the measured duty cycle.

According to one aspect of the invention, the predetermined duty cycle threshold is between 70 and 100%. A high value of the duty cycle increases the efficiency of the conversion module and decreases the risk of the converter overheating. Specifically, for the same average power transferred by the converter, the lower the duty cycle, the higher the instantaneous powers transferred during the peak phases. Conversely, the higher the duty cycle, the lower the instantaneous powers transferred during the peak phases. In the extreme case where the duty cycle is 100%, the instantaneous power transferred during the peak phase corresponds exactly to the average power, the operation of the converter then switches to an on/off mode (alternation of peak phases and rest phases) in a continuous mode which has only one peak phase. In general, the lower the instantaneous powers, the better the overall efficiency of the converter, hence the advantage of working with high duty cycles close to 100%. A margin with respect to 100% is however advantageous in order to provide potential extra power over a cycle. This maximum available extra corresponds to the difference between the instantaneous power and the average power over a cycle.

Thus, preferably, the predetermined duty cycle threshold is of the order of 85 to 90% for efficient operation of the converter while guaranteeing a sufficient extra instantaneous power provision margin.

In one embodiment, the predetermined duty cycle threshold is of the order of 90%.

The invention also relates to a control computer for controlling a combustion engine of a motor vehicle, said engine comprising fuel injectors, said computer comprising a microcontroller, a DC-to-DC voltage converter and a control module for controlling the injectors, said converter comprising:
- a conversion module, configured to convert a DC voltage delivered by a power supply battery of the vehicle into a DC output voltage of higher value delivered to the control module for controlling the injectors by generating a current signal,
- a current control module configured to control said current signal of the conversion module, said "controlled" current signal exhibiting an alternation of phases of (preferably high-frequency) peaks of positive amplitude, allowing the conversion module to be controlled so that it delivers power allowing a target output voltage of the converter to be reached, and of phases of rest during which the value of said controlled current signal is zero, thus defining the envelope of the controlled current signal, a peak phase followed by a consecutive rest phase constituting a cycle and the ratio of the duration of a peak phase to the duration of the corresponding cycle constituting the duty cycle of the envelope of the controlled current signal at a given time, and the microcontroller being configured:
- to measure the duty cycle of the envelope of the controlled current signal,
- when the value of the duty cycle is lower than a predetermined threshold, to control the current control module so that said current control module decreases the amplitude of the controlled current signal and that the duty cycle of the envelope of said controlled current signal thus tends toward said predetermined threshold,
- when the value of the duty cycle is higher than said predetermined threshold, to control the current control module so that said current control module increases the amplitude of the controlled current signal and that the duty cycle of the envelope of said controlled current signal thus tends toward said predetermined threshold.

In one embodiment, the microcontroller comprises a module for measuring the duty cycle of the envelope of the controlled current signal.

In one embodiment, the microcontroller is configured to provide the current control module with a predetermined amplitude value to be achieved for the controlled current signal.

Advantageously, the microcontroller comprises a memory region comprising a plurality of predetermined amplitude values to be reached for the controlled current signal.

Preferably, the microcontroller is capable of selecting the predetermined value from the list of predetermined values according to the measured duty cycle.

According to one aspect of the invention, the conversion module comprises a transistor, comprising a control terminal allowing the transistor to be switched to the on or off position with respect to the flow of the current, and the current control module comprises a latch and an operational amplifier capable of receiving as input the value of the controlled current signal and a predetermined amplitude value to be reached for the controlled current signal and of delivering as output a latch control current such that the latch controls the transistor so as to be in the on position for as long as the value of the controlled current signal is different from the predetermined amplitude value.

According to one feature of the invention, the predetermined duty cycle threshold is between 70 and 95%.

Preferably, the predetermined duty cycle threshold is between 85 and 90%.

More preferably, the predetermined duty cycle threshold is of the order of 90%.

The invention also relates to a motor vehicle comprising a combustion engine and a computer, as presented above, for controlling said combustion engine.

BRIEF DESCRIPTION OF THE DRAWINGS

Further features and advantages of the invention will become apparent from the following description, which is provided with reference to the appended figures, which are given by way of non-limiting examples and in which the same references are given to similar objects.

DESCRIPTION OF THE PREFERRED EMBODIMENTS

The computer according to the invention is a control computer intended to be installed in a motor vehicle with a combustion engine in order to control the injection of fuel into the cylinders of said engine.

Figure 1:
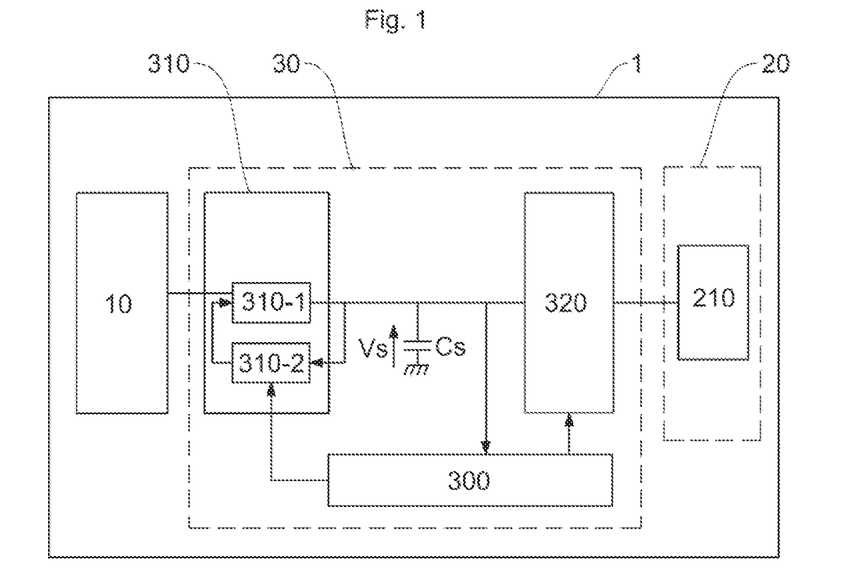
FIG. 1 shows one example of a vehicle according to the invention.

FIG. 1 shows one example of a vehicle 1 according to the invention.

I) Vehicle 1

The vehicle 1 comprises a battery 10, used to supply power to equipment (not shown) of the vehicle 1, an engine 20 and a computer 30 for controlling said engine 20.

A) Battery 10

The battery 10 is an electrical power supply battery on board the vehicle 1 in order to supply power to electrical equipment of said vehicle 1. The battery 10 delivers, for example, a DC voltage whose value may be between 6 and 24 V and that is preferably of the order of 12 V.

B) Engine 20

The engine 20 is a combustion engine comprising a plurality of cylinders on each of which at least one fuel injector 210 is mounted.

C) Computer 30

Still with reference to FIG. 1, the computer 30 comprises a microcontroller 300, a DC-to-DC voltage converter 310 and a control module 320 for controlling the injectors 210.

1) Control Module 320

The control module 320 (commonly known as a "driver") is configured to drive the opening of the fuel injectors 210 on the basis of a what is called "injector control" current delivered by the converter 310.

2) Converter 310

The converter 310 comprises a conversion module 310-1, a current control module 310-2 and a what is called "intermediate" capacitor Cs defining across its terminals an output voltage Vs of the converter 310 used by the control module 320 to control the injectors 210.

i) Conversion Module 310-1

The conversion module 310-1 is configured to convert the DC voltage delivered by the battery 10 into a DC output voltage Vs of higher value, for example of the order of 60 V, delivered to the control module 320 for controlling the injectors 210. The output voltage Vs allows the control module 320 to be provided with a current whose intensity is high enough to control the injectors 210.

ii) Current Control Module 310-2

The current control module 310-2 is configured to generate a controlled current signal I_mes (FIGS. 2 and 3) allowing the conversion module 310-1 to be driven.

Figure 2:
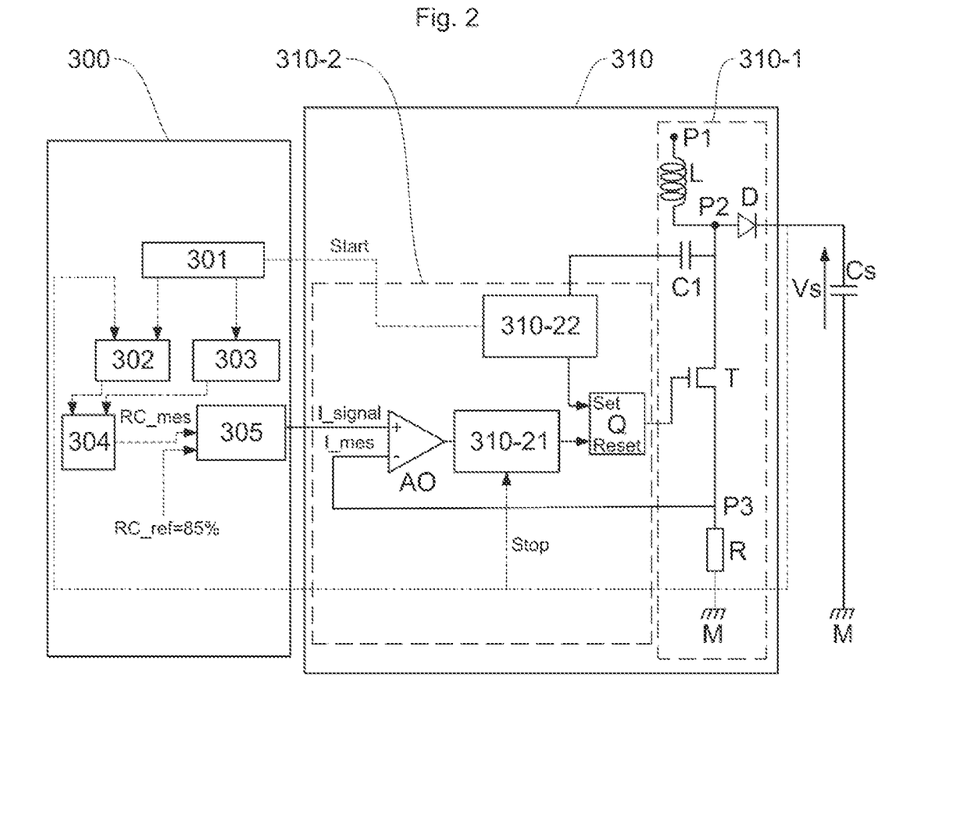
FIG. 2 illustrates one embodiment of the computer according to the invention.
Figure 3:
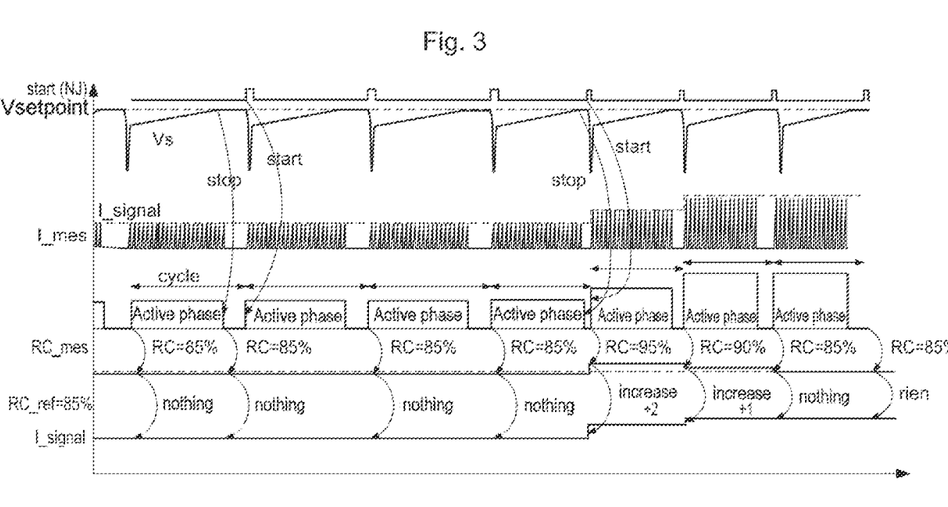
FIG. 3 is a timing diagram illustrating one exemplary implementation of the computer of FIG. 2.

This controlled current signal I_mes exhibits an alternation of peak phases and rest phases. The peak phases (or active phases) have peaks of high frequency, for example of a few hundred hertz, of positive amplitude which allow the conversion module 310-1 to be controlled so that it delivers power allowing a target output voltage of the converter 310, for example 60 V, to be reached. The rest phases (or inactive phases) correspond to phases in which the value of the controlled current signal I_mes is zero.

This succession of peak phases and rest phases takes place at low frequency in what is called "on/off" mode. Since a peak phase followed by a consecutive rest phase constitutes a cycle, the ratio of the duration of a peak phase to the duration of the cycle in which said peak phase occurs constitutes the duty cycle of the envelope of the controlled current signal I_mes at a given time (that of said cycle).

3) Microcontroller 300

The microcontroller 300 performs several functions. First, the microcontroller 300 is configured to measure the duty cycle of the envelope of the controlled current signal I_mes. More precisely, the function of the microcontroller 300 is to measure the duration of the peak phases (duration in which the output voltage Vs measured across the terminals of the intermediate capacitor Cs is lower than the setpoint value (for example 60 V)) and the duration of the rest phases (waiting time before the next injection and after the target voltage has been reached) of the controlled current signal I_mes so as to tend toward a duty cycle as close as possible to the predetermined duty cycle threshold (referenced "reference duty cycle RC_ref" in FIGS. 2 and 3, for example 85%).

Next, the microcontroller 300 is configured to control the current control module 310-2 so that said current control module 310-2 decreases the amplitude of the controlled current signal I_mes when the value of the duty cycle is lower than a predetermined threshold. This allows the duty cycle of the envelope of the controlled current signal I_mes to be increased so that it tends toward said predetermined threshold.

Similarly, the microcontroller 300 is configured to control the current control module 310-2 so that said current control module 310-2 increases the amplitude of the controlled current signal I_mes when the value of the duty cycle is higher than the predetermined threshold. This allows the duty cycle of the envelope of the controlled current signal I_mes to be decreased so that it tends toward said predetermined threshold.

The predetermined duty cycle threshold is between 50% and 100%, and preferably of the order of 85% to 90% in order to increase the efficiency of the conversion module while decreasing the heating of the converter 310.

The microcontroller 300 is also configured to send an injection control signal to the control module 320 for controlling the injectors 210 at predetermined times so that said control module 320 delivers a control current to one or more of the injectors 210 on the basis of the output voltage Vs of the converter 310 so that said injectors 210 inject fuel into the cylinders of the engine 20. Such an injection control signal may for example indicate the fuel injection duration.

Detailed Example of One Embodiment

One detailed embodiment of the computer 30 according to the invention, and more particularly of the microcontroller 300 and of the converter 310, will now be described with reference to FIGS. 2 and 3, without this limiting the scope of the present invention.

In this example, the conversion module 310-1 of the converter 310 comprises an inductor L that is suitable for being connected to the battery 10 of the vehicle 1 at a point P1 and which is connected to a first terminal of a diode D and to a first terminal of a transistor T, for example of MOS type, at a point P2.

The diode D is connected to the intermediate capacitor Cs via its second terminal, the diode D allowing current to flow from its first terminal to its second terminal. A second terminal of the transistor T is connected, at a point P3, to a resistor R which is additionally connected to ground M, the transistor T allowing or preventing the flow of current between its first terminal and its second terminal.

The current control module 310-2 comprises an operational amplifier AO, an off module 310-21 for turning the transistor T off, an on module 310-22 for turning the transistor T on and a latch Q.

The latch Q is a high-frequency latch of SR (set/reset) type that allows the transistor T to be controlled so that it is on or off. To this end, the output of the latch Q is connected to the control terminal of the transistor T, the "SET" input terminal of the latch Q is connected to the on module 310-22 for turning the transistor T on and the "RESET" input terminal of the latch Q is connected to the off module 310-21 for turning the transistor T off.

The negative input terminal of the operational amplifier AO receives the controlled current signal I_mes flowing between the transistor T and the resistor R.

The output of the operational amplifier AO is connected to the input of the off module 310-21 which has the role of switching the transistor T to the off state, via the "Reset" input terminal of the latch Q (which deactivates the latch Q), when the value of the intensity of the controlled current signal I_mes reaches a predetermined current amplitude value, delivered by the microcontroller 300 and denoted I_signal.

The off module 310-21 for turning the transistor T off is also activated when the output voltage Vs of the conversion module 310-1 reaches its target setpoint value (Stop indicator in FIG. 2) by generating a RESET signal on the RESET input of the latch Q.

The on module 310-22 for turning the transistor T on detects the times in which the point P2 of the conversion module 310-1 is at zero potential (called ZVD for zero voltage detection by those skilled in the art) through a capacitor C1 in order to turn the transistor T on by activating the SET input of the latch Q.

The on module 310-22 for turning the transistor T on also activates the SET input of the latch Q when it receives a trigger signal ("Start" in FIG. 2) coming from a management module 301 of the microcontroller 300 corresponding to a start of injection, as will be described below.

The on module 310-22 therefore makes it possible to control, via the latch Q, the current signal flowing through the transistor T so that said controlled current signal I_mes exhibits either peaks in the active phase of the converter, or a zero value when the output voltage Vs of the converter 310 is equal to the target voltage.

In order to regulate the duty cycle of the envelope of the controlled current signal I_mes flowing through the transistor T of the conversion module 310-1, the microcontroller 300 comprises, in this example, a management module 301 that decides the fuel injection start times via the sending of a trigger signal (Start), a measurement module 302 for measuring the duration of a peak phase of the controlled current signal I_mes, a measurement module 303 for measuring the duration of a rest phase of the controlled current signal I_mes, a calculation module for calculating the duty cycle 304 of the active phases on the basis of the measurements taken by the measurement modules 302 and 303 and a selection module 305 comprising the memory region in which a table is stored that comprises a list of predetermined discrete current amplitude values that the controlled current signal I_mes must reach in order to converge toward the predetermined duty cycle threshold RC_ref. After analog conversion, the output of the table is connected to the positive terminal of the operational amplifier AO.

The management module 301 manages the start times of the peak phases of the controlled current signal I_mes by sending trigger signals (Start). The trigger signals (Start) correspond both to the triggering of the injectors 210 controlled by the microcontroller 300 via the control module 320 for controlling the injectors 210 and to the starts of the peak phases triggering the activation of the conversion module 310-1 so that it delivers the power required to reach an output voltage value Vs equal to the target value. The stop signals (Stop) correspond to the precise times when the output voltage Vs of the conversion module 310-1 reaches the setpoint value (end of the peak phase and start of a rest phase).

The internal modules (301, 302, 303, 304, 305) of the microcontroller 300 make it possible to regulate the duty cycle of the envelope of the controlled current signal I_mes to the predetermined duty cycle threshold RC_ref. To achieve this, the calculation module for calculating the duty cycle 304 calculates, at each time, the duty cycle of the envelope of the controlled current signal I_mes on the basis of the signals delivered by the measurement modules 302 and 303.

The selection module 305 compares the calculated duty cycle with the reference duty cycle and then selects from the table, stored in the memory region of the selection module 305, a predetermined current amplitude value I_signal that it delivers as input to the operational amplifier AO of the current control module 310-2 such that the next duty cycle of the envelope of the controlled current signal I_mes calculated corresponds to the reference duty cycle.

Thus, a peak phase is characterized by the delivery of the admissible instantaneous power corresponding to the predetermined current amplitude value I_signal and the inactive phase is characterized by a zero instantaneous power, such that the average power delivered over a cycle of the controlled current signal I_mes corresponds to the instantaneous power over said cycle multiplied by the duty cycle of the envelope of said signal. It follows that the predetermined current amplitude value I_signal is inversely proportional to the duty cycle for the delivery of the same average power over a cycle. For a given cycle, a low duty cycle will exhibit a large current amplitude. Likewise, for a given cycle, a high duty cycle will exhibit a small current amplitude.

The microcontroller 300 is configured to measure the duty cycle of the active phases of the converter 310 and, when the value of the duty cycle is lower than a predetermined duty cycle threshold RC_ref, to decrease the amplitude value I_signal such that the duty cycle of the peak phases of the controlled current signal I_mes tends toward the predetermined duty cycle threshold RC_ref, or, when the value of the duty cycle is higher than the predetermined duty cycle threshold RC_ref, to increase the amplitude value I_signal such that the duty cycle of the envelope of the controlled current signal I_mes tends toward the predetermined duty cycle threshold RC_ref.

It should be noted that, when the value of the duty cycle is equal to the predetermined duty cycle threshold RC_ref, then the microcontroller 300 neither increases nor decreases the amplitude value I_Signal. Specifically, the higher the value of the duty cycle, the lower the amplitude value I_Signal, and the lower the heat losses from the converter 310 and the higher the efficiency of the conversion module 310-1.

However, it may be advantageous to choose a value for the predetermined duty cycle threshold RC_ref that is away from the value of 100%, for example by a few %, preferably by at least 10% in order to avoid the risks associated with a sudden change in the frequency of the injection control signals (and therefore of the injections themselves). Specifically, during a sudden change in speed of the engine 20, for example during a substantial acceleration which requires a higher injection frequency, the frequency of the injection control signals will increase significantly, which will decrease the duration of the cycles of the controlled current signal I_mes. A sudden increase in the frequency of the injections will also lead to a rapid decease in the duration of the rest phase which could be canceled out if the duty cycle of the envelope of the regulation signal is too close to 100%.

II) Implementation

With reference to FIGS. 2 and 3, at each start of fuel injection control (Start (INJ) in FIG. 3), the management module 301 simultaneously controls:

the on module 310-22 for turning the transistor T on so that it starts the peak phase of the conversion module 310-1 by activating the latch Q so that it controls the transistor T so as to be in the active state (i.e. on), the measurement module 302 for measuring the peak phase, so that it starts measuring the duration of the peak phase which is starting, the measurement module 303 for measuring the rest phase so that it stops measuring the duration of the rest phase which is ending.

Each time the output voltage Vs reaches the setpoint value, the management module 301 simultaneously controls:

the off module 310-21 for turning the transistor T off so that it definitively stops the current peak phase until the next triggering of a peak phase (corresponding to a new injection), the measurement module 302 for measuring the peak phase so that it stops measuring the current peak phase, the measurement module 303 for measuring the rest phase so that it starts measuring the duration of the rest phase which is starting.

It should be noted that, in another embodiment, these measurements could be taken by counters triggered by start commands and interrupted by interrupt commands depending on the output voltage Vs of the conversion module 310-1 (for example when the output voltage Vs is higher than the target voltage value).

The duration measured for the last peak phase and the duration measured for the last rest phase are delivered in real time to the duty cycle measurement module 304 so that it calculates the value of the duty cycle, referenced RC_mes in FIGS. 2 and 3.

The selection module 305 calculates the difference in real time between the predetermined duty cycle threshold RC_ref and the calculated duty cycle RC_mes. Depending on the value of the difference, an increase or decrease calculation is performed by the selection module 305. The result of this calculation is associated with the closest of the predetermined (discrete) current amplitude values I_signal from the table stored in the memory region of the selection module 305 (value higher than, lower than or equal to the result of the calculation performed in order to determine the duty cycle).

Thus, the current control (or regulation) performed by the current control module 310-2 makes the controlled current signal I_mes strictly follow the value I_Signal coming from the microcontroller 300. In other words, for as long as the calculated duty cycle value is higher than the predetermined duty cycle threshold RC_ref, the selected amplitude value I_signal will increase in order to raise the power in the peak phases with a view to lowering the duty cycle of the next cycle. Conversely, for as long as the calculated duty cycle value is lower than the predetermined duty cycle threshold RC_ref, the selected amplitude value I_signal from the table will decrease in order to lower the power in the peak phases with a view to increasing the duty cycle of the next cycle.

In the example of FIG. 3, a measured duty cycle RC_mes of 95% (where it was previously 85%) leads to an increase in the amplitude value I_signal by two which corresponds to a new amplitude value I_signal allowing the intensity of the controlled current signal I_mes (which thus follows the new amplitude I_signal) to be increased in an optimized manner. Next, a decrease in the measured duty cycle RC_mes from 95% to 90% leads to a decrease in the amplitude value I_signal by one which corresponds to a new amplitude value I_signal allowing the intensity of the controlled current signal I_mes (which thus follows the new amplitude I_signal) to be decreased in an optimized manner.

Figure 4:
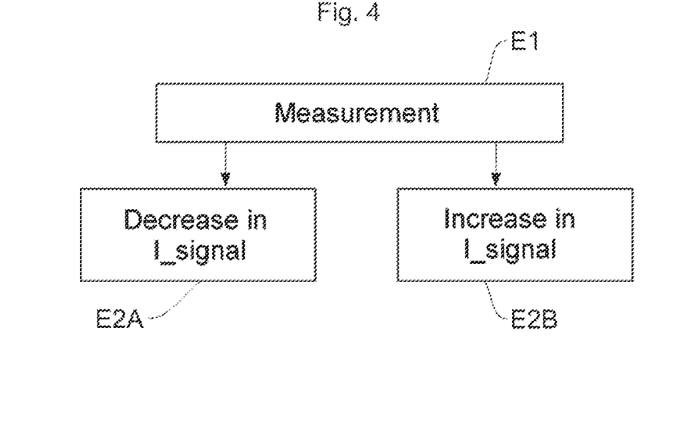
FIG. 4 schematically illustrates one embodiment of the method according to the invention.

With reference to FIG. 4 describing the method according to the invention in general, the microcontroller 300 measures the duty cycle of the peak phases in a step E1. Next, when the value of the measured duty cycle is lower than the predetermined duty cycle threshold RC_ref, the microcontroller 300 controls the amplitude of the controlled current signal I_mes so that it decreases (by choosing a lower predetermined amplitude value) such that the next duty cycles of the controlled current signal I_mes increase and tend toward said predetermined duty cycle threshold in a step E2A or, when the value of the duty cycle is higher than the predetermined duty cycle threshold, the microcontroller 300 controls the amplitude of the controlled current signal I_mes so that it increases (by choosing a higher predetermined amplitude value) such that the next duty cycles of the controlled current signal I_mes decrease and tend toward said predetermined threshold in a step E2B.

In the present example, the microcontroller 300 measures, for a given cycle, the duration of the peak phase and the duration of the rest phase, then deduces therefrom the duration of the cycle (which is the sum of these two durations) and the duty cycle. However, as a variant, the microcontroller 300 could measure the duration of a peak phase and directly the duration of the cycle in which said peak phase occurs in order to deduce the duty cycle therefrom by straightforward division.

The invention therefore advantageously makes it possible to drive the current converter in an optimized manner so as to keep the duty cycle close to a threshold value which makes it possible to optimize its efficiency while limiting its heating.

The invention claimed is:

1. A method for regulating a duty cycle of a controlled current signal (Imes) of a conversion module (310-1) of a DC-to-DC voltage converter (310) of a control computer (30) for controlling a combustion engine (20) of a motor vehicle (1), said combustion engine (20) comprising fuel injectors (210), said control computer (30) comprising a microcontroller (300), the DC-to-DC voltage converter (310) and a control module (320) for controlling the fuel injectors (210), said DC-to-DC voltage converter (310) comprising:
- the conversion module (310-1), configured to convert a DC voltage delivered by a power supply battery (10) of the motor vehicle (1) into a DC output voltage (Vs) of higher value delivered to the control module (320) for controlling the fuel injectors (210) by generating the controlled current signal (Imes),
- a current control module (310-2) configured to control said controlled current signal (Imes) of the conversion module (310-1), said controlled current signal (Imes) exhibiting an alternation of phases of peaks of positive amplitude, allowing the conversion module (310-1) to be controlled so that it delivers power allowing a target output voltage of the DC-to-DC voltage converter (310) to be reached, and of phases of rest during which the value of said controlled current signal (Imes) is zero, thus defining the envelope of the controlled current signal (Imes), a peak phase followed by a consecutive rest phase constituting a cycle and the ratio of the duration of a peak phase to the duration of the corresponding cycle constituting the duty cycle of the envelope of the controlled current signal (Imes) at a given time, said method comprising:
- a step (E1) of measuring, by means of the microcontroller (300), the duty cycle of the envelope of the controlled current signal (Imes),
- when the value of the duty cycle is lower than a predetermined threshold, a step (E2A) of controlling, by means of the microcontroller (300), the current control module (310-2) so that said current control module (310-2) decreases the amplitude of the controlled current signal (Imes) and that the duty cycle of the envelope of said controlled current signal (Imes) thus tends toward said predetermined threshold,
- when the value of the duty cycle is higher than said predetermined threshold, a step (E2B) of controlling, by means of the microcontroller (300), the current control module (310-2) so that said current control module (310-2) increases the amplitude of the controlled current signal (Imes) and that the duty cycle of the envelope of said controlled current signal (Imes) thus tends toward said predetermined threshold.

2. The method as claimed in claim 1, wherein the microcontroller (300) provides the current control module (310-2) with a predetermined amplitude value to be reached for the controlled current signal (Imes).

3. The method as claimed in claim 2, wherein the value of the duty cycle is between 70 and 95%.

4. The method as claimed in claim 3, wherein the value of the duty cycle is between 85 and 90%.

5. The method as claimed in claim 1, wherein the value of the duty cycle is between 70 and 95%.

6. The method as claimed in claim 5, wherein the value of the duty cycle is between 85 and 90%.

7. The method as claimed in claim 6, wherein the value of the duty cycle is about 90%.

8. A control computer (30) for controlling a combustion engine (20) of a motor vehicle (1), said combustion engine (20) comprising fuel injectors (210), said control computer (30) comprising a microcontroller (300), a DC-to-DC voltage converter (310) and a control module (320) for controlling the fuel injectors (210), said DC-to-DC voltage converter (310) comprising:
- a conversion module (310-1), configured to convert a DC voltage delivered by a power supply battery (10) of the motor vehicle (1) into a DC output voltage (Vs) of higher value delivered to the control module (320) for controlling the fuel injectors (210) by generating a current signal (Imes),
- a current control module (310-2) configured to control said current signal (Imes) of the conversion module (310-1), said "controlled" current signal (Imes) exhibiting an alternation of phases of peaks of positive amplitude, allowing the conversion module (310-1) to be controlled so that it delivers power allowing a target output voltage of the DC-to-DC voltage converter (310) to be reached, and of phases of rest during which the value of said controlled current signal (Imes) is zero, thus defining the envelope of the controlled current signal (Imes), a peak phase followed by a consecutive rest phase constituting a cycle and the ratio of the duration of a peak phase to the duration of the corresponding cycle constituting the duty cycle of the envelope of the controlled current signal (Imes) at a given time, wherein said control computer (30) being characterized in that the microcontroller (300) is configured:
- to measure the duty cycle of the envelope of the controlled current signal (Imes),
- when the value of the duty cycle is lower than a predetermined threshold, to control the current control module (310-2) so that said current control module (310-2) decreases the amplitude of the controlled current signal (Imes) and that the duty cycle of the envelope of said controlled current signal thus tends toward said predetermined threshold,
- when the value of the duty cycle is higher than said predetermined threshold, to control the current control module (310-2) so that said current control module (310-2) increases the amplitude of the controlled current signal (Imes) and that the duty cycle of the envelope of said controlled current signal (Imes) thus tends toward said predetermined threshold.

9. The control computer (30) as claimed in claim 8, wherein the microcontroller (300) is configured to provide the current control module (310-2) with a predetermined amplitude value to be reached for the controlled current signal (Imes).

10. The control computer (30) as claimed in claim 9, wherein the value of the duty cycle is between 70 and 95%.

11. The control computer (30) as claimed in claim 10, wherein the value of the duty cycle is between 85 and 90%.

12. The control computer (30) as claimed in claim 8, wherein the value of the duty cycle is between 70 and 95%.

13. The control computer (30) as claimed in claim 12, wherein the value of the duty cycle is between 85 and 90%.

14. The control computer (30) as claimed in claim 13, wherein the value of the duty cycle is about 90%.

\* \* \* \* \*